US008761771B2

(12) United States Patent
Wang

(10) Patent No.: US 8,761,771 B2
(45) Date of Patent: Jun. 24, 2014

(54) METHOD AND SYSTEM FOR RELOCATION

(75) Inventor: Litao Wang, Shenzhen (CN)

(73) Assignee: ZTE Corporation (CN)

( * ) Notice: Subject to any disclaimer, the term of this patent is extended or adjusted under 35 U.S.C. 154(b) by 82 days.

(21) Appl. No.: 13/259,612

(22) PCT Filed: Sep. 29, 2009

(86) PCT No.: PCT/CN2009/074293
§ 371 (c)(1),
(2), (4) Date: Dec. 30, 2011

(87) PCT Pub. No.: WO2010/145105
PCT Pub. Date: Dec. 23, 2010

(65) Prior Publication Data
US 2012/0094671 A1    Apr. 19, 2012

(30) Foreign Application Priority Data

Jun. 30, 2009 (CN) .......................... 2009 1 0108505

(51) Int. Cl.
*H04W 36/14* (2009.01)
(52) U.S. Cl.
USPC ....................................... 455/436; 455/414.1
(58) Field of Classification Search
USPC ............ 370/351, 401; 455/403, 414.1, 414.2, 455/436
See application file for complete search history.

(56) References Cited

U.S. PATENT DOCUMENTS

2005/0075099 A1* 4/2005 Guyot ......................... 455/414.1
2006/0176872 A1* 8/2006 Serna et al. ................... 370/351
2012/0311178 A1* 12/2012 Naz et al. ..................... 709/234

FOREIGN PATENT DOCUMENTS

| CN | 1414804 A | 4/2003 |
| CN | 1747591 A | 3/2006 |
| WO | 2004089019 A1 | 10/2004 |

* cited by examiner

*Primary Examiner* — Myron K Wyche
(74) *Attorney, Agent, or Firm* — Brook Kushman, P.C.

(57) ABSTRACT

Provided in the present invention are a method and a system for implementing a relocation between networks, wherein the method comprises the following steps of: a source wireless access controller sending relocation request message to a target wireless access controller through an Iur-g interface, wherein the relocation request message carries capability of a user equipment (UE) as well as an port number of the Iur-g interface for bearing user plane data which is assigned to the UE by the source wireless access controller; after receiving the request message, the target wireless access controller assigning wireless resources to the UE, checking that the port number of user plane corresponding to the Iur-g interface is available, and sending relocation request acknowledge message to the source wireless access controller; after receiving the relocation request acknowledge message, the source wireless access controller informing the UE to relocate.

10 Claims, 9 Drawing Sheets flow chart of a common relocation
between wireless access controllers

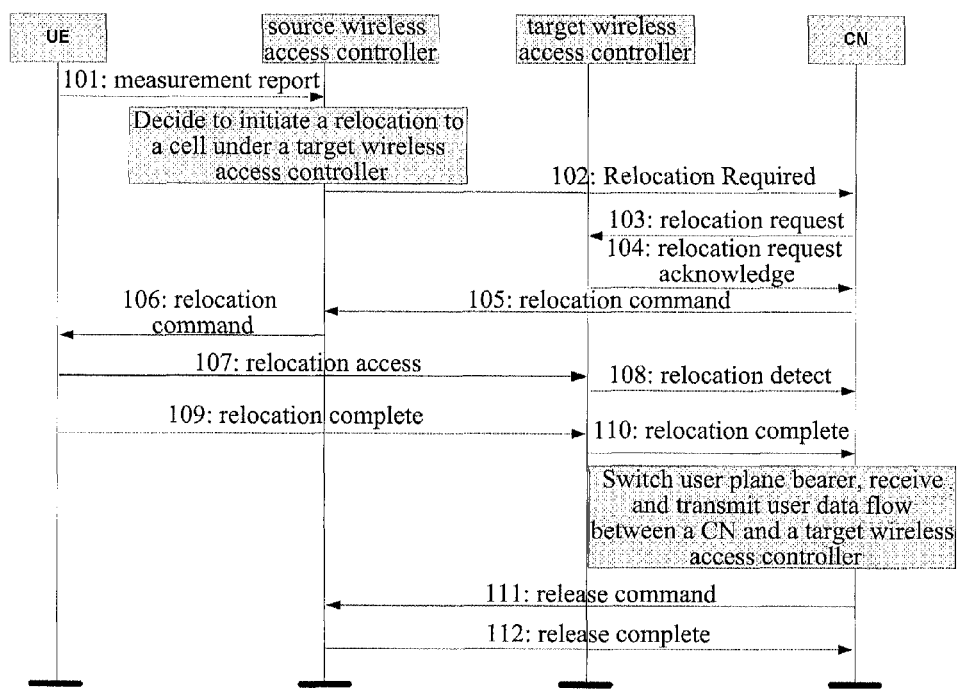
FIG. 1: flow chart of a common relocation between wireless access controllers

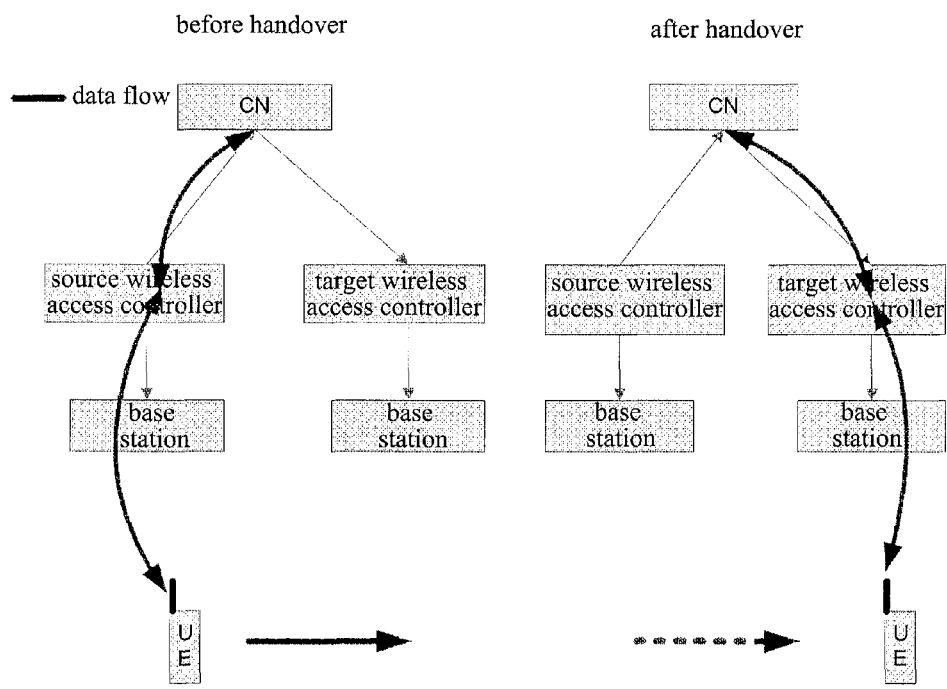
FIG. 2 flow direction of data flow before
and after a common relocation
between wireless access controllers

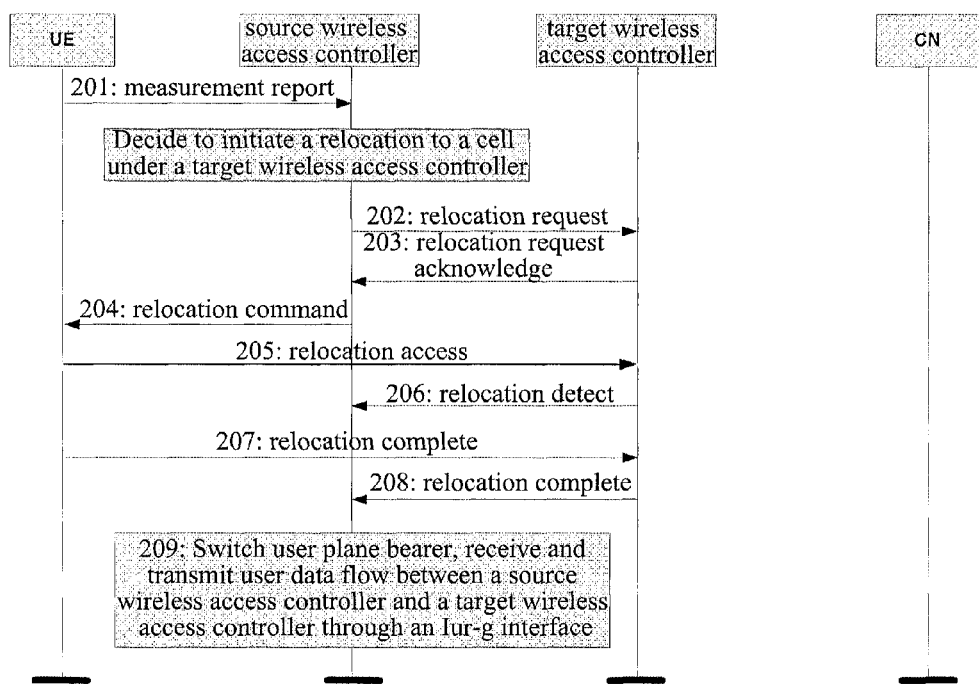
FIG. 3 flow chart of a relocation
implemented through an Iur-g interface

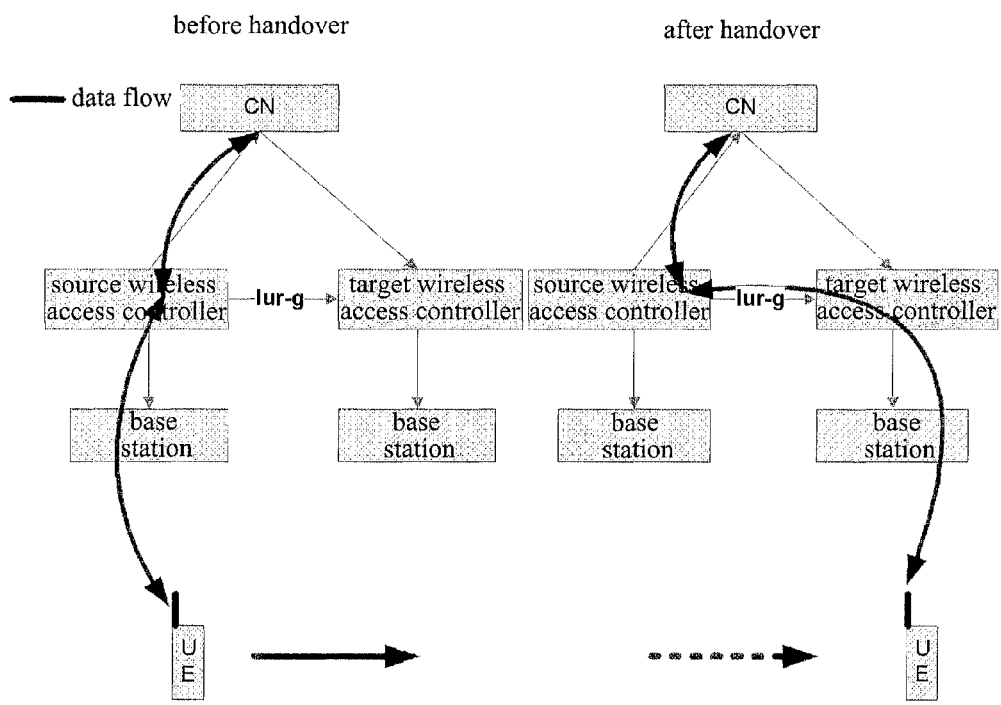
FIG. 4 flow direction of user plane data flow before and after a relocation implemented through an Iur-g interface

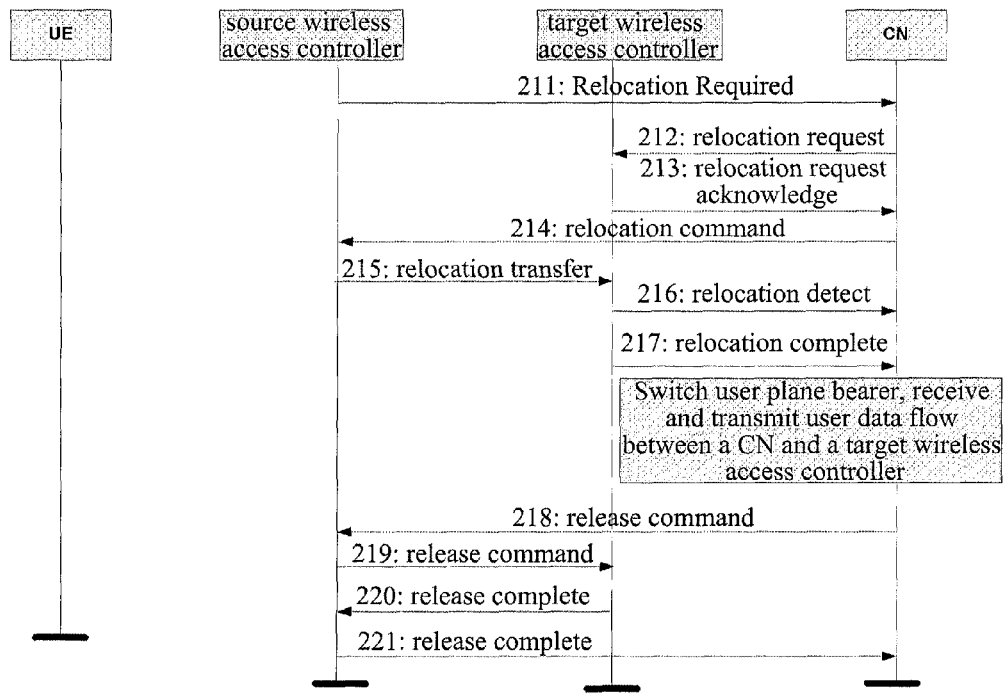
FIG. 5 flow chart of implementing a relocation at CN side at an appropriate moment
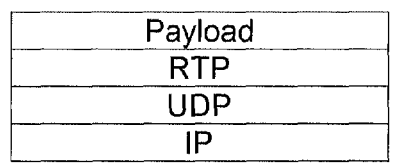
FIG. 6 user plane protocol stack of an Iur-g interface

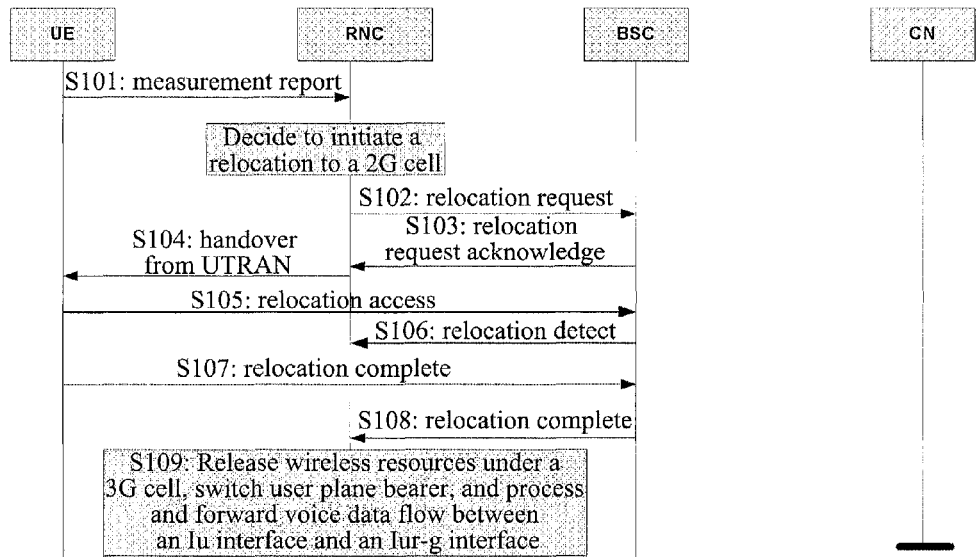
FIG. 7 flow chart of implementing a relocation between systems initiated by a UMTS to a GSM through an Iur-g interface
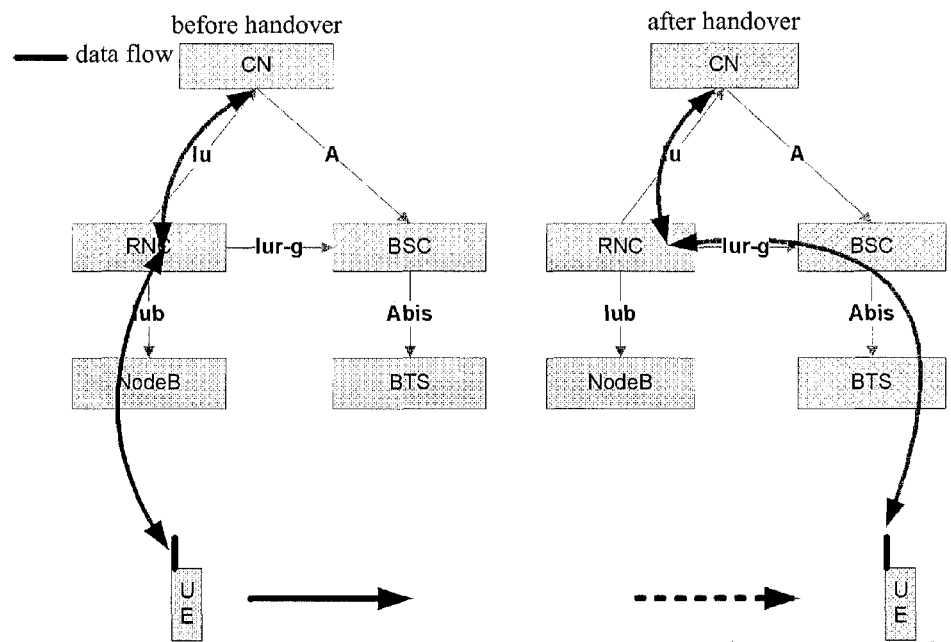
FIG. 8 flow direction of user plane data flow before and after a relocation between systems initiated by a UMTS to a GSM through an Iur-g interface

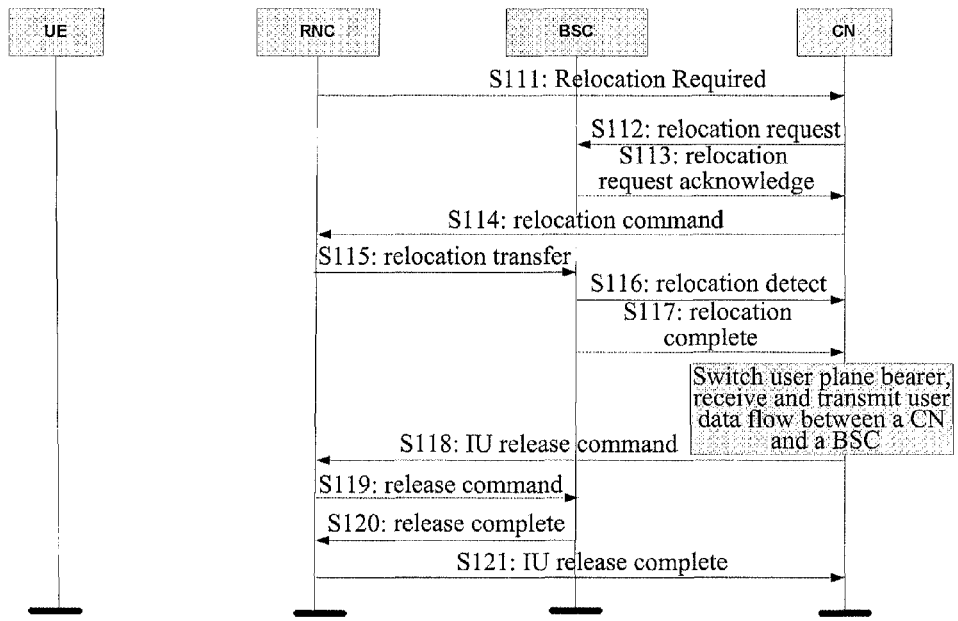
FIG. 9 flow chart of implementing a relocation initiated by a UMTS to a GSM at CN side at an appropriate moment
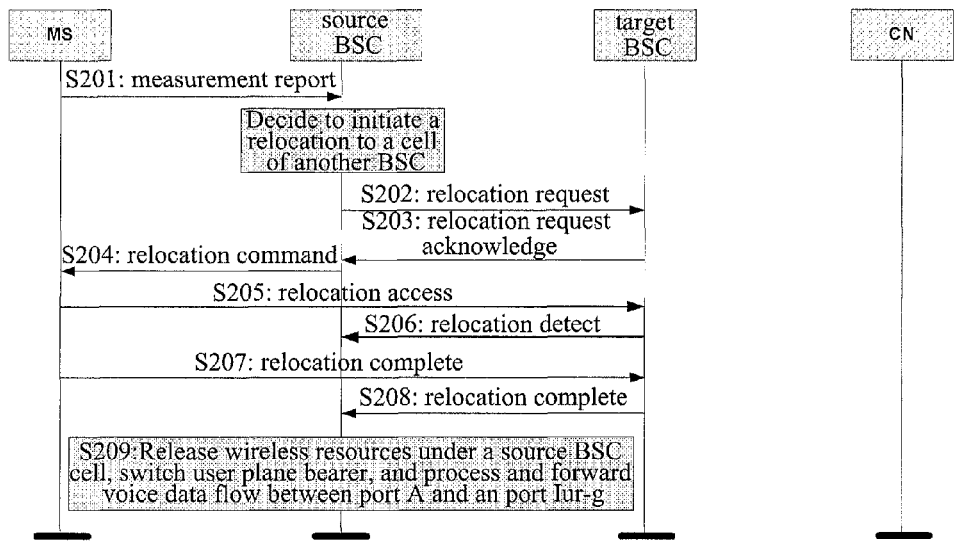
FIG. 10 flow chart of a CS domain of a GSM implementing a relocation through an Iur-g interface

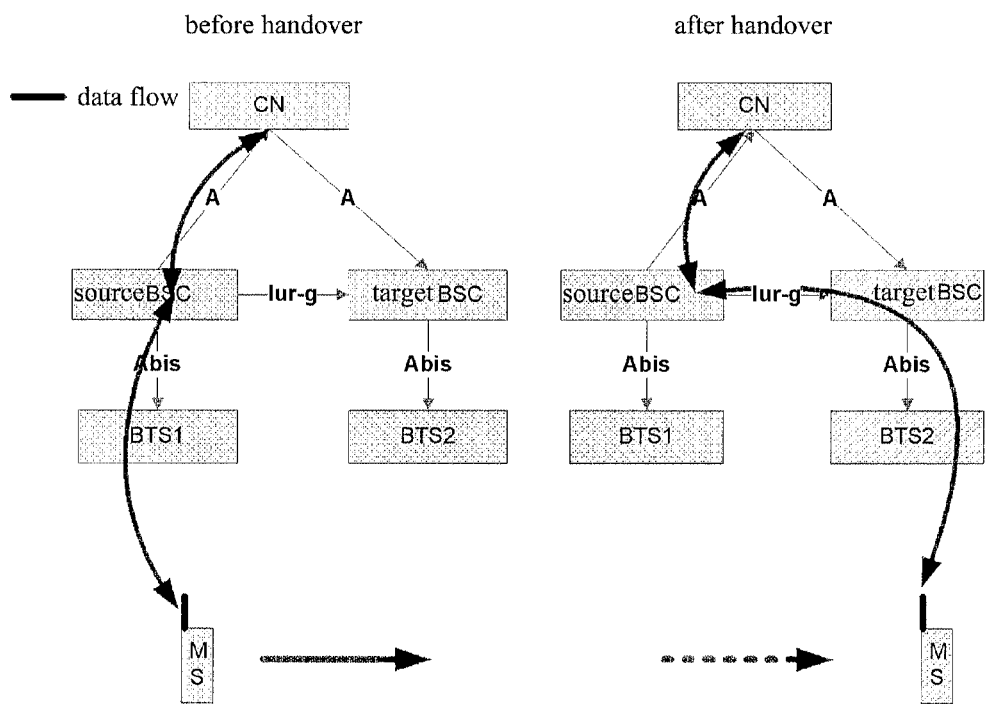
FIG. 11 flow direction of user plane data flow
before and after a relocation implemented
by a CS domain of a GSM through an Iur-g interface

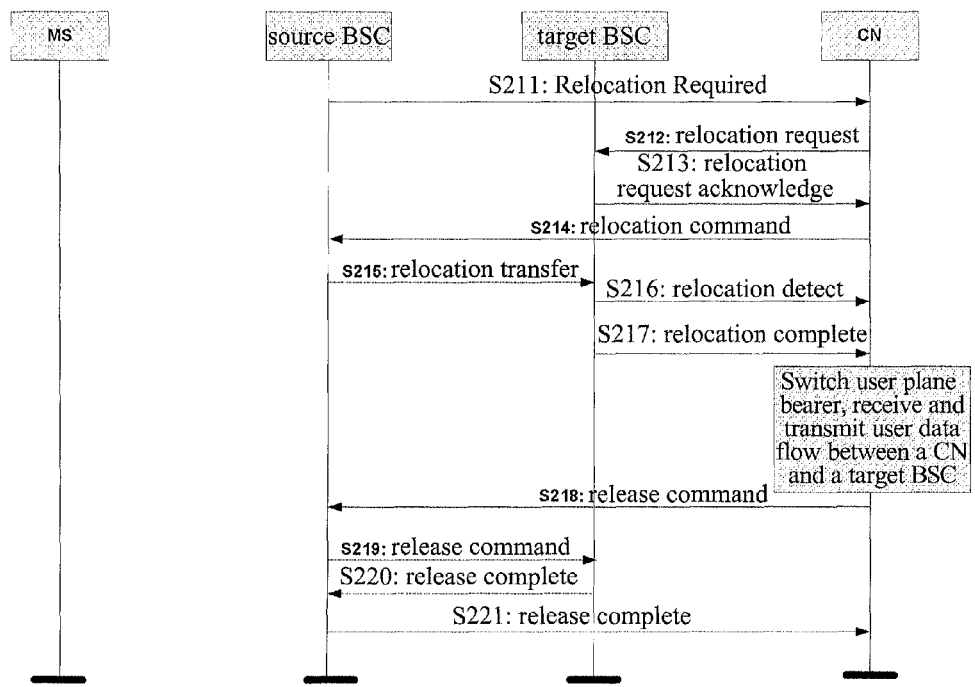
FIG. 12 flow chart of implementing a
relocation at CN side by GSM at an appropriate moment

METHOD AND SYSTEM FOR RELOCATION

CROSS-REFERENCE TO RELATED APPLICATION

This application is the U.S. national phase of PCT Appln. No. PCT/CN 2009/074293filed Sep. 29, 2009 which claims priority to Chinese application 200910108505.9 filed Jun. 30, 2009, the disclosures of which are incorporated in their entirety by reference herein.

BACKGROUND ART

In a mobile communication system, the position of a user often varies while keeping the service, and if an access network radio controller (for example, a RNC (Radio Network Controller) in 3G (3rd Generation), and a BSC (Base Station Controller) of 2G (2nd Generation)) judges that the signal coverage of the source cell where the UE (User Equipment) is located becomes weak, it will select a target cell with better signal coverage for handover.

When the source cell and the target cell belong to different Wireless Access Controllers, the process of UE relocation requires participation of a CN (Core Net). The process is as follows:

Step 101: the wireless access controller where the source cell is located triggering relocation judgment according to a measurement report sent by the UE;

Step 102: if it is found in the judging result that it needs to initiate a relocation to another wireless access controller, the source wireless access controller initiating a relocation required to the CN, wherein the relocation required message carries information of the target cell;

Step 103: the CN initiating a relocation request to the target wireless access controller;

Step 104: the target wireless access controller responding to the CN with a relocation request acknowledge message after completion of wireless resource preparation of the target cell and completion of resources preparation between the target cell and the CN;

Step 105: the CN sending a relocation command to the wireless access controller where the source cell is located;

Step 106: the wireless access controller where the source cell is located notifying the UE to initiate a relocation;

Step 107: the UE attempting to access in a new channel, and sending relocation access message to the target cell;

Step 108: the wireless access controller where the target cell is located sending a relocation detect message to notify the CN;

Step 109: the UE successfully accessing the new channel, and sending relocation complete message to the target cell;

Step 110: the target wireless access controller informing the CN of relocation complete;

Step 111: the CN notifying the wireless access controller where the source cell is located to release related resources of the UE;

Step 112: the wireless access controller where the source cell is located completing the release of the related resources and sending release complete message to the CN.

Various steps in the above process are implemented in series in terms of time, and especially during the time period from step 101 to step 106, the UE is still using the wireless resources of the source cell, so if the UE moves very fast, the wireless resource signal of the source cell rapidly deteriorates, and the probability of a relocation failure of the UE will be rather high.

In the 3GPP (3rd Generation Partnership Project) international standard protocol, there is a standard interface Iur-g between the wireless access systems, but this standard interface only supports signaling inter-transmission in the control plane.

SUMMARY OF THE INVENTION

The present invention provides a method for implementing relocation between networks so as to solve the problem of high probability of a relocation failure.

A standard Iur-g interface only supports a signaling interaction in the control plane. The present invention extends this interface, so as to make it also support inter-transmission of the user plane, meanwhile, by adding new relocation-related messages, the UE is enabled to successfully relocate from the source wireless access controller to the target wireless access controller, thereby obtaining the technical scheme of the present invention.

The so-called "relocation between networks" in the present invention is precisely a handover between networks.

The present invention provides a method for implementing a relocation between networks, comprising the following steps of:

a source wireless access controller sending relocation request message to a target wireless access controller via an Iur-g interface disposed between the source wireless access controller and the target wireless access controller, wherein the relocation request message carries capability of a user equipment (UE) as well as an port number of the Iur-g interface for bearing user plane data that is assigned to the UE by the source wireless access controller;

after receiving the relocation request message, the target wireless access controller assigning wireless resources to the UE, checking whether the port number of the Iur-g interface for bearing user plane data that is assigned by the source wireless access controller is available or not, if yes, then sending relocation request acknowledge message to the source wireless access controller; and, after receiving the relocation request acknowledge message, the source wireless access controller notifying the UE to initiate a relocation.

The wireless access controller includes a radio network controller (RNC) or a base station controller (BSC).

In the above method, wherein, prior to said step of the source wireless access controller sending the relocation request message to the target wireless access controller via the Iur-g interface, the method further comprises;

the source wireless access controller performing a relocation judgment according to a measurement report reported by the UE: if a target cell is located in a wireless access controller different from that of a source cell, and there is an Iur-g interface between the source wireless access controller and the target wireless access controller, then the relocation is implemented through the Iur-g interface; if there is no Iur-g interface, the relocation is implemented through a core network (CN) according to a normal flow of the relocation.

In the above method, wherein, after said step of the target wireless access controller receiving the relocation request message, the method further comprises;

if there are wireless resources conforming to the UE in the target wireless access controller, and meanwhile the port number for bearing user plane data is available, then assigning a relocation identifying number to the UE, and filling the relocation request acknowledge message with the wireless resources and the relocation identifying number to be sent to the source wireless access controller.

The above method further comprises:

the UE sending relocation access message to the target wireless access controller, so as to access a new channel.

The above method further comprises:

after receiving the relocation access message of the UE, the target wireless access controller sending relocation detect message to the source wireless access controller via the Iur-g interface to inform the source wireless access controller that the UE is accessing the target wireless access controller; and, after successfully accessing the new channel, the UE sending relocation complete message to the target wireless access controller.

The above method further comprises:

after receiving the relocation complete message sent by the UE, the target wireless access controller sending the relocation complete message to the source wireless access controller via the Iur-g interface; and, after receiving the relocation complete message sent by the target wireless access controller, the source wireless access controller judging whether the relocation of the UE has been successfully implemented, if yes, releasing resources of its source cell, and the UE performing transmission of signaling and/or user plane data with the CN using the Iur-g interface.

In the above method, wherein, said step of the UE performing transmission of signaling and/or user plane data with the CN using the Iur-g interface comprises:

sending uplink signaling and/or user plane data from the target wireless access controller to the source wireless access controller via the Iur-g interface, then the source wireless access controller forwarding the uplink signaling and/or user plane data to the CN, wherein the adaptation of a message in the signaling or a conversion of voice data in the user plane data can be implemented by the source wireless access controller or the target wireless access controller; and, sending downlink signaling and/or user plane data from the CN to the source wireless access controller, then the source wireless access controller forwarding the downlink signaling and/or user plane data to the target wireless access controller via the Iur-g interface, wherein the adaptation of a message in the signaling or the conversion of voice data in the user plane data can be implemented by the source wireless access controller or the target wireless access controller.

The present invention further provides a system for implementing relocation between networks, comprising a source wireless access controller and a target wireless access controller, between which there is an Iur-g interface, wherein, the source wireless access controller is configured to:

judge whether it needs to initiate a relocation according to a measurement report reported by a user equipment (UE), if yes, send a relocation request message to the target wireless access controller via the Iur-g interface, wherein the relocation request message carries capability of the UE as well as an port number of the Iur-g interface for bearing user plane data that is assigned to the UE by the source wireless access controller; and, notify the UE to initiate the relocation after receiving a relocation request acknowledge message from the target wireless access controller so that the UE attempts to access the target wireless access controller, and send relocation access message;

the target wireless access controller is configured to:

after receiving the relocation request message from the source wireless access controller, assign wireless resources to the UE, and check whether the port number of the Iur-g interface for bearing user plane data that is assigned by the source wireless access controller is available or not, if yes, assign a relocation identifying number to the UE and send the relocation request acknowledge message to the source wireless access controller.

The wireless access controller includes a RNC, and a BSC.

In the above system, wherein, the target wireless access controller is further configured to: after receiving the relocation access message of the UE, send relocation detect message to the source wireless access controller via the Iur-g interface to inform the source wireless access controller that the UE is accessing the target wireless access controller.

In the above system, wherein, the target wireless access controller is further configured to: receive relocation complete message sent by the UE after the UE successfully accesses a new channel, and send the relocation complete message to the source wireless access controller via the Iur-g interface;

the source wireless access controller is further configured to: after receiving the relocation complete message sent by the target wireless access controller, judge whether the relocation of the UE has been successfully implemented, if yes, release the resources of a source cell such that the UE performs transmission of signaling and/or user plane data with a core network (CN) using the Iur-g interface.

In the above system, wherein, the source wireless access controller or the target wireless access controller is further configured to implement a conversion of a format of the user plane data.

Compared with the prior art, the scheme of the relocation through an Iur-g interface in the technical scheme of the present invention reduces the delay introduced in the resource preparation process from a source wireless access controller to a core network (CN), and meanwhile decreases the probability of relocation failure due to the blocking of the CN resources, in the whole process of relocation.

The method of the present invention can realize a network relocation between a 3G network and a 2G network, and between 2G networks.

BRIEF DESCRIPTION OF DRAWINGS

FIG. 1 is a flow chart of a common relocation between wireless access controllers;

FIG. 2 illustrates the flow direction of the data flow before and after a common relocation between wireless access controllers;

FIG. 3 is a flow chart of a relocation implemented through an Iur-g interface according to the present invention;

FIG. 4 illustrates the flow direction of the user plane data flow before and after a relocation implemented through an Iur-g interface according to the present invention;

FIG. 5 is a flow chart of implementing a relocation at the CN side at an appropriate moment according to the present invention;

FIG. 6 illustrates a user plane protocol stack of an Iur-g interface;

FIG. 7 is a flow chart of implementing relocation between systems initiated by a UMTS to a GSM through an Iur-g interface according to an example of the present invention;

FIG. 8 illustrates the flow direction of user plane data flow before and after the relocation initiated by a UMTS to a GSM between systems through an Iur-g interface according to an example of the present invention;

FIG. 9 is a flow chart of implementing the relocation initiated by a UMTS to a GSM at the CN side at an appropriate moment according to an example of the present invention;

FIG. 10 is a flow chart of a CS domain of a GSM implementing the relocation through an Iur-g interface according to another example of the present invention;

FIG. 11 illustrates the flow direction of user plane data flow before and after the relocation implemented by a CS domain of a GSM through an Iur-g interface according to another example of the present invention;

FIG. 12 is a flow chart of implementing the handover at the CN side at an appropriate moment by GSM according to another example of the present invention.

PREFERRED EMBODIMENTS OF THE INVENTION

The technical scheme of the present invention will be further described below with reference to the drawings.

Since a standard Iur-g interface only supports IP transmission, the present invention extends the standard Iur-g interface, so as to make it support user plane data transmission, wherein user plane data are born in the same way as the user plane data under IP mode of port A, i.e., both by /UDP/IP, and the specific protocol stack is as shown in FIG. 6.

As shown in FIG. 3, the method of the present invention is implemented through the following steps:

Step 201: the wireless access controller where the source cell is located triggering a relocation judgment according to a measurement report sent by the UE;

Step 202: if it is found in the judging result that it needs to initiate the relocation to another wireless access controller, and there is an Iur-g interface between the source wireless access controller and the target wireless access controller, the source wireless access controller directly sending relocation request message to the target wireless access controller through the interface, wherein the message carries capability of a UE as well as an port number of the Iur-g interface for bearing user plane data that is assigned to the UE by the source wireless access controller;

Step 203: the target wireless access controller assigning a wireless resource to the UE, and meanwhile checking whether the port number corresponding to the Iur-g interface is available or not, if yes, assigning a relocation identifying number to the UE, and sending relocation request acknowledge message to the source wireless access controller, wherein the message includes the wireless resource and relocation identifying number assigned to the UE;

Step 204: the source wireless access controller sending to the UE a relocation command after receiving the relocation request acknowledge message of the target wireless access controller;

Step 205: the UE attempting to access a new channel, and sending relocation access message to the target wireless access controller;

Step 206: after receiving the relocation access message of the UE, the target wireless access controller sending relocation detect message to the source wireless access controller via the Iur-g interface to inform the source wireless access controller that this UE is attempting to handover to the target wireless access controller;

Step 207: after successfully accessing a new channel, the UE sending relocation complete message to the target wireless access controller;

Step 208: upon receiving the relocation complete message sent by the UE, the target wireless access controller informing the source wireless access controller through the Iur-g interface that the UE has successfully relocated to the target wireless access controller;

Step 209: the source wireless access controller believing that the UE has successfully relocate after receiving the relocation complete message sent by the target wireless access controller, releasing the resource of its source cell, and meanwhile switching the data of the user plane of the UE to the Iur-g interface.

The wireless access controller of the present invention may be a RNC or a BSC.

The flow direction of the user plane data before and after the handover is shown in FIG. 4.

As shown in FIG. 5, after the UE successfully relocates to the target wireless access controller, the relocation at the CN side can also be implemented at an appropriate moment, and this relocation is totally shielded to the UE. The UE can be enabled to be totally relocated to the target access system through this relocation process, which can not only inform the CN side of the current position of the UE, but also reduce a complexity of system processing when the UE reinitiates the relocation subsequently. Said step of implementing the relocation at the CN side is as follows:

Step 211: the source wireless access controller sending the relocation required message to the CN at an appropriate moment, the relocation required message carrying the information of the target cell and the relocation identifying number information of the UE; wherein, the relocation identifying number of the UE is written into the field brought to the target access controller by the source wireless access controller, for example, a field of Old BSS To New BSS Information, which is transparent to the CN and will be forwarded by the CN unconditionally;

Step 212: the CN initiating a relocation request to the target wireless access controller;

Step 213: the target wireless access controller judging whether it needs to associate to the UE handing over from the Iur-g interface according to whether the field brought to the target access controller by the source wireless access controller, for example, the Old BSS To New BSS Information field, in the message carries the relocation identifying number, if yes, associating the specific UE according to the relocation identifying number, and returning relocation request acknowledge message to the CN;

Step 214: the CN sending a relocation command to the wireless access controller where the source cell is located;

Step 215: the wireless access controller where the source cell is located sending relocation transfer message to the target wireless access controller through an Iur-g interface;

Step 216: the target wireless access controller sending relocation detect message to inform the CN;

Step 217: the target wireless access controller sending relocation complete message to the CN;

Step 218: the CN notifying the wireless access controller where the source cell is located to release related resource of the UE;

Step 219: the wireless access controller where the source cell is located sending a release command to the target wireless access controller via the Iur-g interface;

Step 220: the target wireless access controller releasing Iur-g-related resources, and returning release complete message to the source wireless access controller;

step 221: the source wireless access controller sending the release complete message to the CN.

The wireless access controller of the present invention may be a RNC or a BSC. Afterwards, the UE totally relocates to the target wireless access controller, and the messages and voices between the UE and the CN are totally processed and forwarded only by the target wireless access controller just as other users, and the source wireless access controller does not process the messages and user data of the UE any more.

The implementing process of Example 1 of the present invention will be described with reference to the flow of CS (Circuit Switch) domain inter-system relocation initiated by a UMTS (Universal Mobile Telecommunications System) of a 3G network to a GSM (Global System for Mobile Communications) of a 2G network, wherein, in the UMTS of a 3G network, the source wireless access controller is a wireless network controller RNC, and the target wireless access controller in a 2G network is a base station controller BSC, but the application scene of the present invention is not limited thereto.

FIG. 7 is a flow chart corresponding to Example 1 of the present invention.

Step S101: the UE successfully establishing a CS service in cell 1 of the source RNC, and after the UE moves, the source RNC triggering a relocation judgment according to the measurement report of the UE;

Step S102: the source RNC selecting cell 2 of the target BSC as the target cell, the source RNC requesting the target BSC to assign the related wireless resources to the UE through relocation request message of the Iur-g interface; wherein the message carries information including the identifier of the target cell 2, capability of the UE, the user plane port number assigned to the UE by the source RNC on the Iur-g interface, etc.;

Step S103: after receiving the relocation request message through the Iur-g interface, the target BSC assigning corresponding wireless resources for the UE in cell 2, and meanwhile checking whether the user plane port number corresponding to the Iur-g interface is available or not, if yes, assigning a relocation identifying number for the UE and responding to the source RNC with relocation request acknowledge message;

Step S104: after receiving the relocation request acknowledge message of the target BSC, the source RNC immediately sending to the UE a command to handover from the UTRAN (Universal Terrestrial Radio Access Net);

Step S105: the UE attempting to access a new channel, and sending handover access message to the target BSC;

Step S106: after receiving the handover access of the UE, the target BSC sending handover detect message to the source RNC through the Iur-g interface to inform the source RNC that this UE is attempting to handover to the target BSC;

Step S107: after successfully accessing the new channel, the UE sending handover complete message to the target BSC;

Step S108: upon receiving the handover complete message sent by the UE, the target BSC also informing the source RNC through the Iur-g interface that the UE has successfully handed over to the target BSC;

Step S109: after receiving the handover complete message sent by the target BSC, the source RNC believing that the UE has successfully handed over, it releasing the resources of its source cell, and meanwhile switching the data of the user plane of the UE to the Iur-g interface.

Afterwards, for the target BSC, the source RNC is just like a CN, the messages between the source RNC and the target BSC can be interacted through the interface A flow, and the source RNC implements adaptation processing between interface A and the Iu interface. The uplink message is sent to the source RNC by the target BSC through the Iur-g interface, the source RNC implements adaptation from interface A to interface Iu, and the uplink message is sent to the CN. The downlink message is sent from the CN to the source RNC, the source RNC implements adaptation from port Iu to port A, and the downlink message is sent to the target BSC. Conversion of the user plane data from 2G format to 3G format can be implemented by the target BSC, the uplink data are delivered to the source RNC through the Iur-g interface after being processed by the BSC and are then forwarded to the CN by the source RNC; the downlink data are also delivered to the source RNC from the CN and are then forwarded to the target BSC through the Iur-g interface, then the target BSC performs the format conversion processing. The flow direction of the user plane data before and after handover is as shown in FIG. 8.

Such handover scheme implemented through an Iur-g interface reduces the delay introduced in the resource preparation process from a source wireless access controller to a core network (CN), and meanwhile decreases the probability of handover failure due to the blocking of the CN resources in the whole handover process.

Afterwards, the source RNC can also initiate a relocation process at the CN side at an appropriate moment, and the specific steps are as follows:

Step S111: the source RNC sending a relocation required message to the CN at an appropriate moment, wherein the relocation required message carries information of the target cell 2 and the relocation identifying number of the UE filled into the Old BSS To New BSS Information field;

Step S112: the CN initiating a handover request to the target BSC;

Step S113: the target BSC judging whether it needs to associate to the UE handed over from the Iur-g interface according to whether the field of Old BSS To New BSS Information field in the message carries the relocation identifying number, if yes, associating the specific UE according to the relocation identifying number, and returning handover request acknowledge message to the CN;

Step S114: the CN sending a relocation command to the source RNC;

Step S115: the source RNC sending relocation transfer message to the target BSC through an Iur-g interface;

Step S116: the target BSC sending handover detect message to inform the CN;

Step S117: the BSC sending handover complete message to the CN;

Step S118: the CN sending an Iu release command to the source RNC;

Step S119: the source RNC sending an Iur-g resource release command to the target BSC through the Iur-g interface;

Step S120: the target BSC releasing Iur-g-related resources, and returning release complete message to the source RNC;

Step 121: the source RNC sending Iu release complete message to the CN.

Afterwards, the UE has totally handed over to the target BSC, and the target BSC processes its messages and user data in the same way as other users.

The implementation process of Example 2 of the present invention will be described by taking the CS domain relocation between GSMs in a 2G network as an example, but the application scene of the present invention is not limited thereto.

FIG. 10 is a flow chart corresponding to Example 2 of the present invention.

Step S201: the mobile phone successfully establishing a CS service in cell 1 of the source BSC, and after the mobile phone moves, the source BSC triggering a handover judgment according to the measurement report of the mobile phone;

Step S202: the source BSC selecting cell 2 of the target BSC as the target cell, the source BSC requesting the target BSC to assign related wireless resources to the mobile phone through relocation request message of the Iur-g interface; the message carries information including the identifier of the target cell 2, capability of the mobility, the user plane port number assigned to the mobile phone by the source BSC on the Iur-g interface, etc.;

Step S203: after receiving the relocation request message through the Iur-g interface, the target BSC assigning corresponding wireless resources for the mobile phone in cell 2, and meanwhile checking whether the user plane port number corresponding to the Iur-g interface is available or not, if yes, assigning a relocation identifying number for the mobile phone and responding to the source BSC with relocation request acknowledge message;

Step S204: after receiving the relocation request acknowledge message of the target BSC, the source BSC immediately sending to the mobile phone a handover command;

Step S205: the mobile phone attempting to access a new channel, and sending handover access message to the target BSC;

Step S206: after receiving the handover access message of the mobile phone, the target BSC sending handover detect message to the source BSC through the Iur-g interface to inform the source BSC that this mobile phone is attempting to handover to the target BSC;

Step S207: after successfully accessing the new channel, the mobile phone sending handover complete message to the target BSC;

Step S208; upon receiving the handover complete message sent by the mobile phone, the target BSC also informing the source BSC through the Iur-g interface that the mobile phone has successfully handed over to the target BSC;

Step S209: after receiving the handover complete message sent by the target BSC, the source BSC believing that the mobile phone has successfully handed over, it releasing the resources of its source cell, and meanwhile switching the data of the user plane of the mobile phone to the Iur-g interface.

Afterwards, for the target BSC, the source BSC is just like a CN. The uplink message is sent to the source BSC by the target BSC through the Iur-g interface, and is then forwarded to the CN by the source BSC. The downlink message is sent from the CN to the source BSC and then is forwarded to the target BSC by the source BSC through the Iur-g interface. If the voice codec type before and after handover does not change, the source BSC also plays a function of forwarding between the target BSC and the CN, the uplink data are sent to the source BSC by the target BSC through the Iur-g interface and are then forwarded to the CN by the source BSC, while the downlink data are also sent to the source BSC from the CN and are then forwarded to the target BSC through the Iur-g interface, and if the voice codec type before and after handover changes, one of the BSCs must implement a conversion of the voice codec type. The flow of the user plane data before and after handover is as shown in FIG. 11.

Such handover scheme implemented through an Iur-g interface reduces the delay introduced in the resource preparation process from a source wireless access controller to a core network (CN), and meanwhile decreases a probability of handover failure due to the blocking of the CN resources, in the whole handover process.

Afterwards, the source BSC can also initiate a handover process at the CN side at an appropriate moment, and the specific steps are as follows:

Step S211: the source BSC sending handover required message to the CN at an appropriate moment, wherein the handover required message carries information of the target cell 2 and the relocation identifying number of the mobile phone filled into the Old BSS To New BSS Information field;

Step S212: the CN initiating a handover request to the target BSC;

Step S213: the target BSC judging whether it needs to associate to the mobile phone handed over from the Iur-g interface according to whether the Old BSS To New BSS Information field in the message carries the relocation identifying number, if yes, associating the specific UE according to the relocation identifying number, and returning a handover request acknowledge message to the CN;

Step S214: the CN sending a handover command to the source BSC;

Step S215: the source BSC sending relocation transfer message to the target BSC through an Iur-g interface;

Step S216: the target BSC sending handover detect message to inform the CN;

Step S217: the target BSC sending handover complete message to the CN;

Step S218: the CN sending a release command to the source BSC;

Step S219: the source BSC sending a release command to the target BSC through the Iur-g interface;

Step 220: the target BSC releasing Iur-g-related resources, and returning release complete message to the source BSC;

Step 221: the source BSC sending the release complete message to the CN.

Afterwards, the mobile phone has totally handed over to the target BSC, and the target BSC processes its messages and user data in the same way as other users.

In order to implement the above method, the present invention further provides a system for implementing a relocation between networks, which comprises a source wireless access controller and a target wireless access controller, between which there is an Iur-g interface, wherein, the source wireless access controller is configured to:

judge whether it needs to initiate a relocation according to a measurement report reported by a user equipment (UE), if yes, send relocation request message to the target wireless access controller via the Iur-g interface, wherein the relocation request message carries capability of the UE as well as an port number of the Iur-g interface for bearing user plane data that is assigned to the UE by the source wireless access controller; and, notify the UE to initiate a relocation after receiving relocation request acknowledge message from the target wireless access controller so that the UE sends relocation access message to the target wireless access controller;

the target wireless access controller is configured to:

after receiving the relocation request message from the source wireless access controller, assign wireless resources to the UE, and check whether the port number of the Iur-g interface for bearing user plane data that is assigned by the source wireless access controller is available or not, if yes, assign a relocation identifying number to the UE and send the relocation request acknowledge message to the source wireless access controller.

The wireless access controller includes a RNC, and a BSC.

In the above system, the target wireless access controller is further configured to: after receiving the relocation access message of the UE, send relocation detect message to the source wireless access controller via the Iur-g interface to inform the source wireless access controller that the UE is accessing the target wireless access controller.

In the above system, the target wireless access controller is further configured to: receive relocation complete message sent by the UE after the UE successfully accesses a new channel, and send the relocation complete message to the source wireless access controller via the Iur-g interface;

the source wireless access controller is further configured to: after receiving the relocation complete message sent by the target wireless access controller, judge whether the relocation of the UE has been successfully implemented, if yes, release resources of a source cell such that the UE performs transmission of signaling and/or user plane data with a core network (CN) using the Iur-g interface.

In the above system, the source wireless access controller or the target wireless access controller is further configured to implement a format conversion of the user plane data.

The above various steps are only general flows of the present invention, and are not intended to limit the present invention. For a person having ordinary skill in the art, the present invention may have various modifications and changes. Any modification, equivalent substitution, improvement and so on made within the spirit and principle of the present invention shall be within the protection scope of the present invention.

INDUSTRIAL APPLICABILITY

Compared with the prior art, the relocation scheme implemented through an Iur-g interface in the present invention reduces the delay introduced in the resource preparation process from a source wireless access controller to a core network (CN), and meanwhile decreases the probability of a relocation failure due to the blocking of the CN resources in the whole process of relocation.

What is claimed is:

1. A method for implementing a relocation between networks, comprising the following steps:

a source wireless access controller sending relocation request message to a target wireless access controller via an Iur-g interface disposed between the source wireless access controller and the target wireless access controller, wherein the relocation request message carries capability of a user equipment (UE) as well as an port number of the Iur-g interface for bearing user plane data that is assigned to the UE by the source wireless access controller;

after receiving the relocation request message, if there are wireless resources conforming to the UE in the target wireless access controller, and meanwhile the port number of the Iur-g interface for bearing user plane data that is assigned by the source wireless access controller is available, then assigning a relocation identifying number to the UE, filling a relocation request acknowledge message with the wireless resources and the relocation identifying number, and sending the relocation request acknowledge message to the source wireless access controller; and, after receiving the relocation request acknowledge message, the source wireless access controller notifying the UE to initiate the relocation.

2. The method according to claim 1 wherein, prior to said step of the source wireless access controller sending the relocation request message to the target wireless access controller via the Iur-g interface, the method further comprises:

the source wireless access controller performing a relocation judgment according to a measurement report reported by the UE: if a wireless access controller of a target cell is not the same as that of a source cell, and there is the Iur-g interface between the source wireless access controller and the target wireless access controller, then the relocation is implemented through the Iur-g interface; if there is not the Iur-g interface, the relocation is implemented through a core network (CN) according to a normal relocation flow.

3. The method according to claim 1, further comprising:
the UE sending relocation access message to the target wireless access controller so as to access a new channel.

4. The method according to claim 3, further comprising:
after receiving the relocation access message of the UE, the target wireless access controller sending relocation detect message to the source wireless access controller via the Iur-g interface to inform the source wireless access controller that the UE is accessing the target wireless access controller; and, after successfully accessing the new channel, the UE sending relocation complete message to the target wireless access controller.

5. The method according to claim 4, further comprising:
after receiving the relocation complete message sent by the UE, the target wireless access controller sending the relocation complete message to the source wireless access controller via the Iur-g interface; and, after receiving the relocation complete message sent by the target wireless access controller, the source wireless access controller judging whether the relocation of the UE has been successfully implemented, if yes, releasing resources of the source cell, and the UE performing transmission of signaling and/or user plane data with the CN using the Iur-g interface.

6. The method according to claim 5 wherein, said step of the UE performing transmission of signaling and/or user plane data with the CN using the Iur-g interface comprises:

sending uplink signaling and/or user plane data from the target wireless access controller to the source wireless access controller via the Iur-g interface, then the source wireless access controller forwarding the uplink signaling and/or user plane data to the CN, wherein a message adaption in the signaling or a voice data conversion in the user plane data can be implemented by the source wireless access controller or the target wireless access controller; and, sending downlink signaling and/or user plane data from the CN to the source wireless access controller, then the source wireless access controller forwarding the downlink signaling and/or user plane data to the target wireless access controller via the Iur-g interface, wherein the message adaptation in the signaling or the voice data conversion in the user plane data can be implemented by the source wireless access controller or the target wireless access controller.

7. A system for implementing a relocation between networks comprising a source wireless access controller and a target wireless access controller, between which there is an Iur-g interface, wherein, the source wireless access controller is configured to:
judge whether it is needed to initiate a relocation according to a measurement report reported by a user equipment (UE), if yes, send relocation request message to the target wireless access controller via the Iur-g interface, wherein the relocation request message carries capability of the UE as well as an port number of the Iur-g interface for bearing user plane data that is assigned to the UE by the source wireless access controller; and, notify the UE to initiate the relocation after receiving relocation request acknowledge message from the target wireless access controller so that the UE attempts to access the target wireless access controller, and send relocation access message;

the target wireless access controller is configured to:
after receiving the relocation request message from the source wireless access controller, if there are wireless resources conforming to the UE in the target wireless access controller, and meanwhile the port number of the Iur-g interface for bearing user plane data that is assigned by the source wireless access controller is available, then assign a relocation identifying number to the UE, fill a relocation request acknowledge message with the wireless resources and the relocation identifying number, and send the relocation request acknowledge message to the source wireless access controller.

8. The system according to claim 7, wherein, the target wireless access controller is further configured to:
after receiving the relocation access message sent by the UE, send relocation detect message to the source wireless access controller via the Iur-g interface to inform the source wireless access controller that the UE is accessing the target wireless access controller.

9. The system according to claim 7 wherein,
the target wireless access controller is further configured to:
receive relocation complete message sent by the UE after the UE successfully accesses a new channel, and send the relocation complete message to the source wireless access controller via the Iur-g interface;
the source wireless access controller is further configured to:
after receiving the relocation complete message sent by the target wireless access controller, judge whether a handover of the UE has been successfully implemented, if yes, releasing resources of a source cell such that the UE performs transmission of signaling and/or user plane data with a core network (CN) using the Iur-g interface.

10. The system according to claim 9 wherein,
the source wireless access controller or the target wireless access controller is further configured to implement a format conversion for the user plane data.

* * * * *